United States Patent
Jeon et al.

(10) Patent No.: US 7,651,177 B2
(45) Date of Patent: Jan. 26, 2010

(54) METHOD FOR CONTROLLING REGENERATIVE BRAKING OF ELECTRIC VEHICLE

(75) Inventors: Gab Bae Jeon, Gunpo-si (KR); Byeong Cheol Yang, Daegu (KR)

(73) Assignee: Hyundai Motor Company, Seoul (KR)

( * ) Notice: Subject to any disclaimer, the term of this patent is extended or adjusted under 35 U.S.C. 154(b) by 419 days.

(21) Appl. No.: 11/648,732

(22) Filed: Dec. 29, 2006

(65) Prior Publication Data

US 2008/0116743 A1 May 22, 2008

(30) Foreign Application Priority Data

Nov. 17, 2006 (KR) .................. 10-2006-0113780

(51) Int. Cl.
*B60T 8/64* (2006.01)
*B60T 7/12* (2006.01)

(52) U.S. Cl. .................. 303/151; 303/152; 303/149; 701/90

(58) Field of Classification Search .............. 303/149, 303/150, 151, 152, 163; 701/22, 71, 90
See application file for complete search history.

(56) References Cited

U.S. PATENT DOCUMENTS

| 4,848,852 | A * | 7/1989 | Inoue et al. ............. 303/152 |
| 5,508,924 | A * | 4/1996 | Yamashita ............. 701/22 |
| 7,077,484 | B2 * | 7/2006 | Sasaki et al. ............. 303/152 |
| 2002/0180266 | A1 * | 12/2002 | Hara et al. ............. 303/152 |
| 2006/0220453 | A1 * | 10/2006 | Saito et al. ............. 303/152 |
| 2007/0108837 | A1 * | 5/2007 | Ohkubo et al. ............. 303/122.08 |
| 2008/0100132 | A1 * | 5/2008 | Jeon et al. ............. 303/152 |

* cited by examiner

*Primary Examiner*—Thomas J Williams
(74) *Attorney, Agent, or Firm*—Morgan, Lewis & Bockius LLP

(57) ABSTRACT

A method for controlling regenerative braking of an electric that compensates the difference between slip amounts of left and right wheels when an anti-lock braking system ABS is activated in a regenerative braking mode of the driving wheels in the electric vehicle. Steps include activating an anti-lock braking system in a regenerative braking mode of the electric vehicle, detecting slip amounts of left and right wheels to compare the same, and controlling to reduce a hydraulic braking torque or a regenerative braking torque in accordance with the difference between the slip amounts of left and right wheels.

1 Claim, 4 Drawing Sheets

Abs control when difference between slip amounts of left and right wheels occurs Abs control when difference between slip amounts of left and right wheels is small ——— total braking torque (braking torque that driver wants)
——— braking torque by hydraulic control
——— regenerative braking torque generated Change curves of hydraulic braking torque and regenerative braking torque in general regenerative braking mode

METHOD FOR CONTROLLING REGENERATIVE BRAKING OF ELECTRIC VEHICLE

CROSS-REFERENCE TO RELATED APPLICATION

This application claims the benefit of Korean Patent Application No. 10-2006-0113780, filed on Nov. 17, 2006, the entire disclosure of which is hereby incorporated by reference.

BACKGROUND OF THE INVENTION

1. Field of the Invention

The present invention relates to a method for controlling regenerative braking of an electric vehicle and, more particularly, to a method for controlling regenerative braking of an electric vehicle that compensates the difference between slip amounts of left and right wheels when an anti-lock braking system ABS is activated in a regenerative braking mode.

2. Description of Related Art

In general, an electric vehicle is a vehicle that drives a motor using electric energy stored in a battery and uses the driving force of the motor as a power source wholly or partially. At present, the electric vehicle is classified into a pure electric vehicle that applies only the electric energy of the battery as the power source and a hybrid electric vehicle that includes an engine to apply the power generated from the engine to the battery charge and/or to the driving of the vehicle.

In general, an electric vehicle in braking applies a portion of braking force to the generation of electric power and uses the generated electric energy in charging the battery. Here, a portion of the kinetic energy is used as energy required for driving an electric generator, thus realizing the reduction of the kinetic energy (i.e., the reduction of the driving speed) and the generation of electric energy at that same time. This braking method is called the regenerative braking.

The generation of the electric energy in the regenerative braking mode is achieved by a separate electric generator or by driving the motor reversely. By the regenerative braking control in braking the electric vehicle, the available driving distance of the electric vehicle is increased. In case of the hybrid electric vehicle, fuel efficiency is improved and the generation of noxious exhaust gas is reduced as well.

A hydraulic brake system that causes a braking force by hydraulic pressure may be equipped in the electric vehicle However, such a hydraulic brake system may not attain a sufficient braking force only with the regenerative braking force, since desirable vehicle dynamics control cannot be obtained only with the braking force of the driving wheels as the regenerative braking force is generated in the driving wheels connected to the motor.

According to a conventional regenerative braking control method and apparatus, the regenerative braking control is performed in addition to the hydraulic braking force produced as the brake pedal is operated by a driver. The regenerative braking force is controlled in a quantity that is not related to the magnitude of the total braking force required or the magnitude of the hydraulic braking force. Thus, the braking force (the operation of the brake pedal) that the driver wants is made of the sum total of the hydraulic braking force and the regenerative braking force. Accordingly, if a desired braking force is not obtained only with the regenerative braking force, the hydraulic braking force that generates thermal energy by the frictional force of a disc and a pad is applied as much as its difference, and the regenerative braking force operates the electric generator when reducing the speed of the driving motor dedicated to the drive to generate the necessary braking force and, at the same time, the electric power generated at this time is stored in the battery.

As can be found from the graph of FIG. 5 depicting the changes in a hydraulic braking torque and a regenerative braking torque in the regenerative braking mode, the regenerative braking torque is generated as soon as the braking is started and the hydraulic braking torque by the hydraulic control is added thereto, thus generating a braking force that the driver wants.

However, conventional regenerative braking systems have drawbacks in that there is no control for compensating the difference between slip amounts of left and right wheels when the ABS is activated in the regenerative braking mode, thus generating the unnecessary hydraulic braking torque and regenerative braking torque.

SUMMARY OF THE INVENTION

Embodiments of the present invention provide a method for controlling regenerative braking of an electric vehicle that compensates the difference between slip amounts of left and right wheels when an anti-lock braking system ABS is activated in a regenerative braking mode of the driving wheels in the electric vehicle. Accordingly, it is possible to improve the control of regenerative braking by making the most of the quick response of the regenerative braking torque when the ABS is operated in the regenerative braking mode. Moreover, since the difference between the slip amounts of left and right wheels that may occur if the left and right road surface states are different from each other is compensated, it is possible to stabilize the vehicle state when the ABS is operated and prevent the unnecessary reduction of the hydraulic braking force and the regenerative braking force.

In exemplary embodiments of the present invention, there is provided a method for controlling regenerative braking of an electric vehicle comprising the steps of: activating an anti-lock braking system in a regenerative braking mode of the electric vehicle; detecting slip amounts of left and right wheels to compare the same; and controlling to reduce a hydraulic braking torque or a regenerative braking torque in accordance with the difference between the slip amounts of left and right wheels.

As a further exemplary embodiment, if the difference between the slip amounts of left and right wheels is more than a reference value, a control for reducing a hydraulic braking torque is first made by a hydraulic brake controller and then a control for reducing a regenerative braking torque is made for the reduced amount.

As another exemplary embodiment, if the difference between the slip amounts of left and right wheels is less than a reference value, a control for reducing a regenerative braking torque is first made by a regenerative brake controller and then a control for reducing a hydraulic braking torque is made for the reduced amount.

BRIEF DESCRIPTION OF THE DRAWINGS

The above and other features of the present invention will be described with reference to certain exemplary embodiments thereof illustrated the attached drawings in which.

DETAILED DESCRIPTION OF THE INVENTION

Hereinafter, exemplary embodiments of the present invention will be described in detail with reference to the attached drawings.

Figure 1:
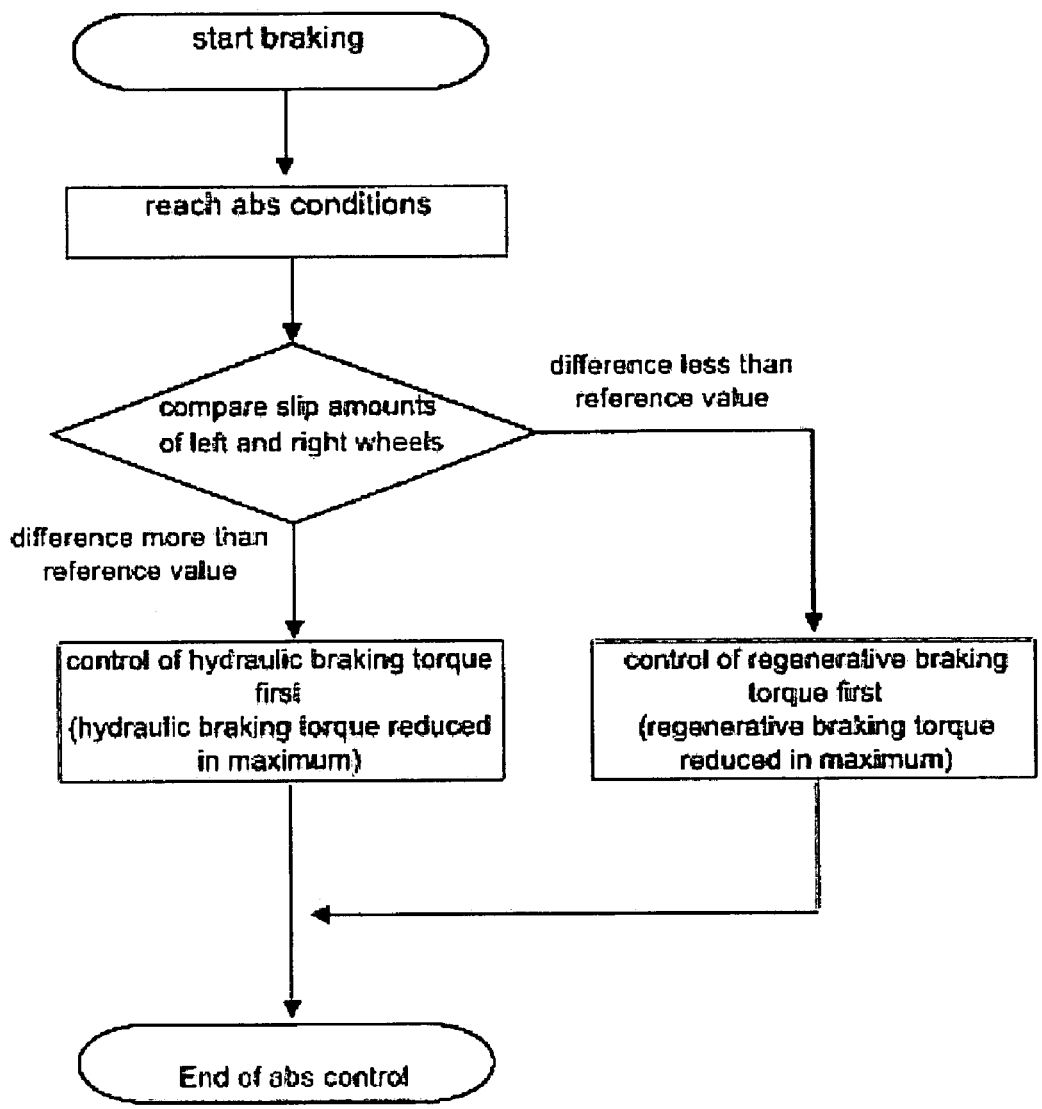
FIG. 1 is a flowchart illustrating a method for controlling regenerative braking of an electric vehicle in accordance with an embodiment of the present invention.

With reference to FIG. 1, in an exemplary embodiment of the invention, cooperative control method between the hydraulic braking by the hydraulic brake and the regenerative braking by the speed reduction of the motor comprises: a step of judging a driver's braking demand in a hydraulic brake controller; a step of calculating an available maximum regenerative braking force other than the hydraulic braking force and transmitting the calculated result to a regenerative brake controller in the hydraulic brake controller; a step of deciding a regenerative braking amount and transmitting the same to the hydraulic brake controller in a regenerative brake controller; and a step of receiving the amount of the regenerative braking force to be made and deciding a hydraulic control amount for the hydraulic braking to apply an oil pressure to the hydraulic brake in the hydraulic brake controller. The controller may comprise a processor, memory and associated hardware and software as may be selected and programmed by a person of ordinary skill in the art based on the teachings contained herein.

If an anti-lock braking system ABS is activated in the regenerative braking mode as described above, the difference between the slip amounts of left and right wheels is detected and compared in the controller and, then, the control for reducing the hydraulic braking torque or the regenerative braking torque is made in accordance with the difference between the slip amounts of left and right wheels.

Figure 2:
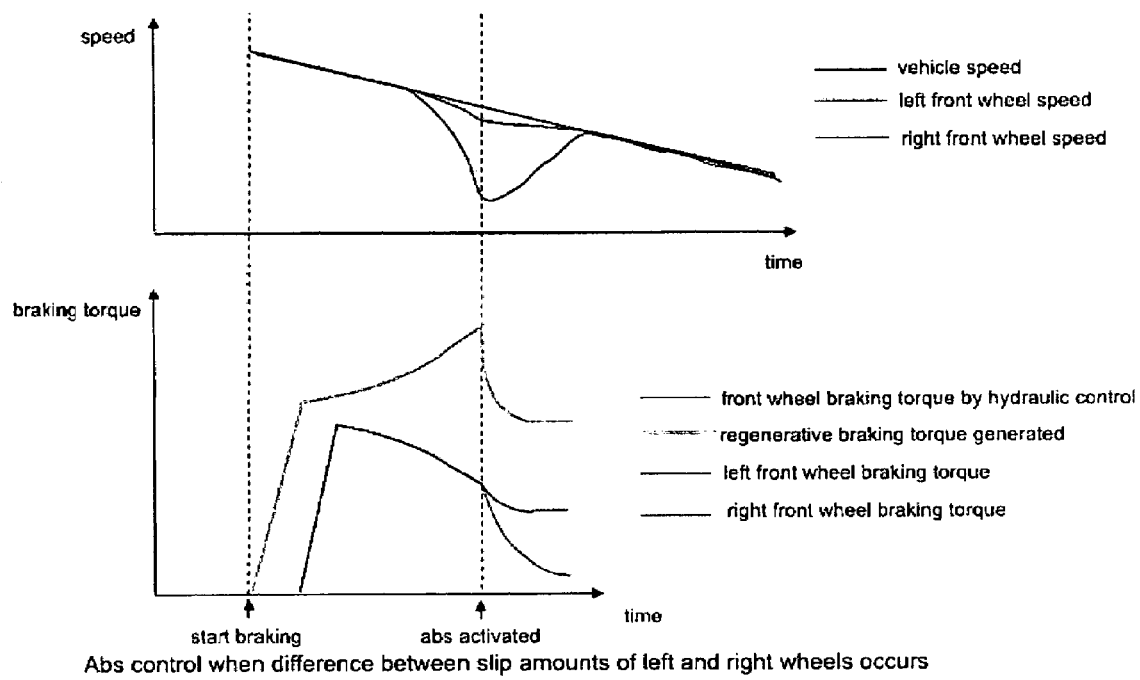
FIG. 2 is a graph illustrating a method for controlling regenerative braking of an electric vehicle in accordance with an embodiment of the present invention, in which the changes in a hydraulic braking torque and a regenerative braking torque are shown when the difference between slip amounts of left and right wheels when an ABS is activated is large.

As can be seen from FIG. 2, if the difference between the slip amounts of left and right wheels is more than a reference value, the control for reducing the hydraulic braking torque is made by the hydraulic brake controller. That is, if left and right road surface states are different from each other when the ABS is activated in the regenerative braking mode, a large difference between the slip states of left and right wheels occurs. Accordingly, the hydraulic brake controller controls the hydraulic control amounts to be supplied to wheel cylinders of left and right wheels differently, thus reducing the hydraulic braking torque in maximum and, at the same time, reducing the regenerative braking amount by the control of the regenerative brake controller as much as necessary.

Figure 3:
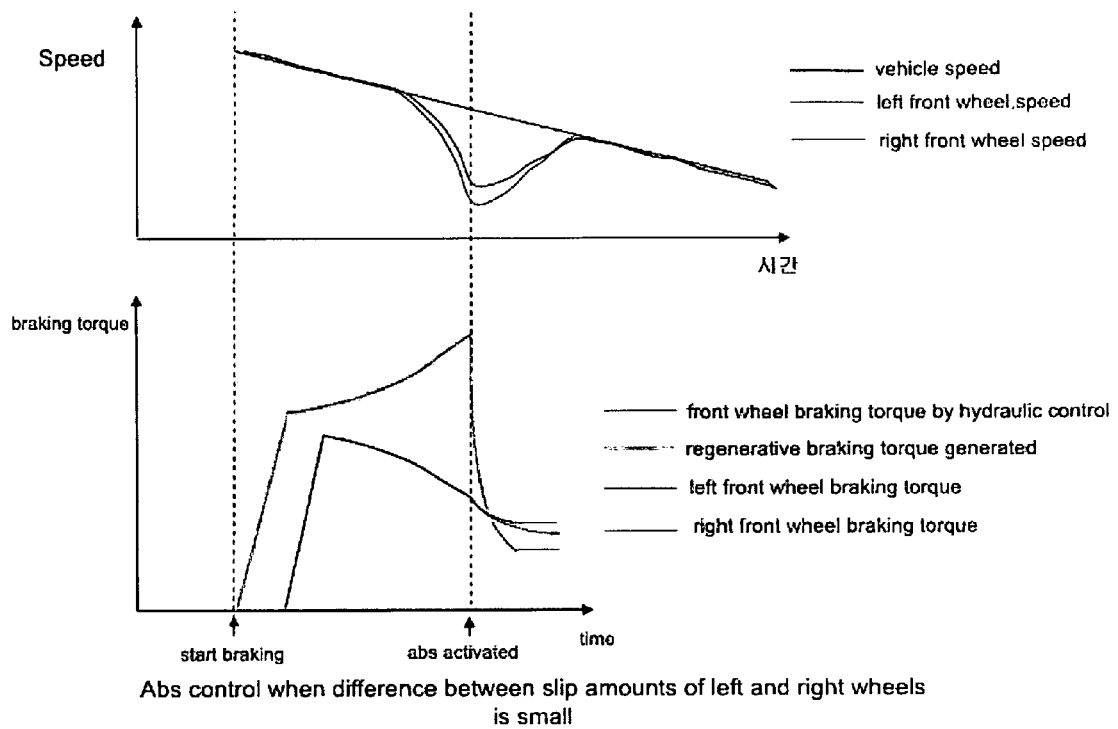
FIG. 3 is a graph illustrating a method for controlling regenerative braking of an electric vehicle in accordance with an embodiment of the present invention, in which the changes in a hydraulic braking torque and a regenerative braking torque are shown when the difference between slip amounts of left and right wheels when an ABS is activated is small.
Figure 4:
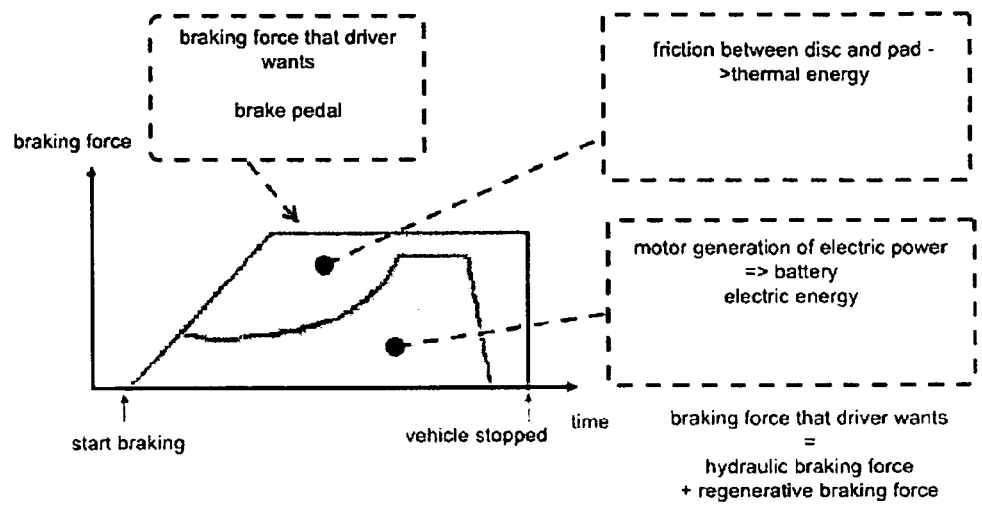
FIG. 4 is a schematic diagram illustrating a cooperative control between a hydraulic braking and a regenerative braking according to an embodiment of the present invention.
Figure 5:
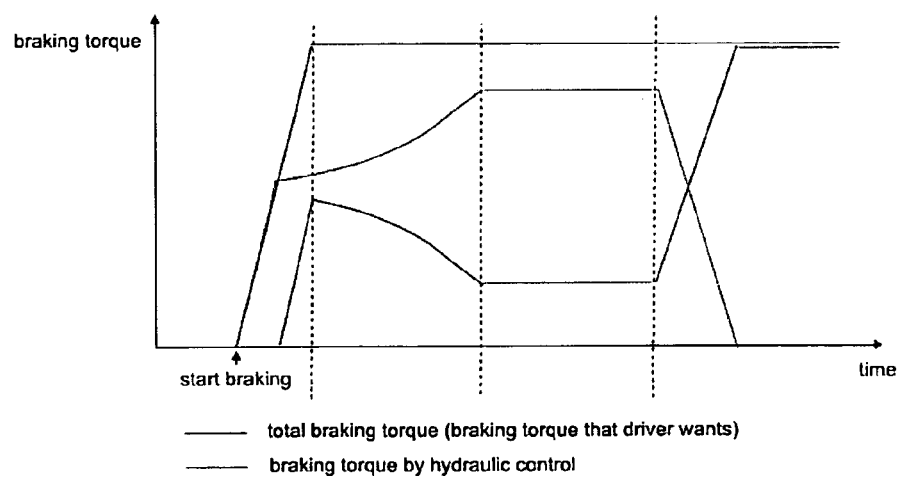
FIG. 5 is a graph depicting the changes in a hydraulic braking torque and a regenerative braking torque in a general regenerative braking mode.

As can be seen from FIG. 3, if the difference between the slip amount of left and right wheels is less than a reference value, the control for reducing the regenerative braking torque is made by the regenerative brake controller. That is, if the difference between the slip states of left and right wheels is small when the ABS is activated in the regenerative braking mode, the regenerative braking torque of the motor is reduced by the regenerative brake controller in maximum, thus reducing the regenerative braking amount remarkably and, at the same time, reducing the hydraulic braking amount a little.

Like this, if the ABS is activated in the regenerative braking mode, the difference between the slip amounts of left and right wheels is compensated, thus stabilizing the vehicle state when the ABS is operated and reducing the unnecessary use of the hydraulic braking force and the regenerative braking force.

As described above, the method for controlling regenerative braking of an electric vehicle in accordance with the present invention compensates the difference between the slip amounts of left and right wheels when the ABS is activated in the regenerative braking mode of the electric vehicle. Accordingly, it is possible to improve the control of regenerative braking by making the most of the quick response of the regenerative braking torque when the ABS is operated in the regenerative braking mode. Since the difference between the slip amounts of left and right wheels that may occur if the left and right road surface states are different from each other is compensated, it is possible to stabilize the vehicle state when the ABS is operated and reduce the unnecessary reduction of the hydraulic braking force and the regenerative braking force.

As above, preferred embodiments of the present invention have been described and illustrated, however, the present invention is not limited thereto, rather, it should be understood that various modifications and variations of the present invention can be made thereto by those skilled in the art without departing from the spirit and the technical scope of the present invention as defined by the appended claims.

What is claimed is:

1. A method for controlling regenerative braking of an electric vehicle, comprising:
    activating an anti-lock braking system in a regenerative braking mode of the electric vehicle;
    detecting slip amounts of left and right wheels to compare the same; and
    controlling to reduce a hydraulic braking torque or a regenerative braking torque in accordance with the difference between the slip amounts of left and right wheels,
    wherein, if the difference between the slip amounts of left and right wheels is more than a reference value, a control for reducing a hydraulic braking torque is first made by a hydraulic brake controller and then a control for reducing a regenerative braking torque is made for the reduced amount, and
    wherein, if the difference between the slip amounts of left and right wheels is less than a reference value, a control for reducing a regenerative braking torque is first made by a regenerative brake controller and then a control for reducing a hydraulic braking torque is made for the reduced amount.

* * * * *